US012015224B1

(12) United States Patent
Jakubowicz

(10) Patent No.: US 12,015,224 B1
(45) Date of Patent: Jun. 18, 2024

(54) ELECTRONIC DEVICE CHARGER ACCESSORY

(71) Applicant: Stanley Mark Jakubowicz, Vero Beach, FL (US)

(72) Inventor: Stanley Mark Jakubowicz, Vero Beach, FL (US)

( * ) Notice: Subject to any disclaimer, the term of this patent is extended or adjusted under 35 U.S.C. 154(b) by 460 days.

(21) Appl. No.: 17/323,660

(22) Filed: May 18, 2021

Related U.S. Application Data

(60) Provisional application No. 63/034,481, filed on Jun. 4, 2020.

(51) Int. Cl.
*H01R 13/639* (2006.01)
*H01R 13/52* (2006.01)

(52) U.S. Cl.
CPC ..... *H01R 13/6392* (2013.01); *H01R 13/5213* (2013.01); *H01R 13/6395* (2013.01)

(58) Field of Classification Search
USPC .......................................................... 320/107
See application file for complete search history.

(56) References Cited

U.S. PATENT DOCUMENTS 4,921,444 A 5/1990 Cama
6,250,946 B1 6/2001 Tardy
6,317,933 B1 11/2001 Suenaga
6,652,307 B2 11/2003 Tatz
7,056,145 B2 6/2006 Campbell, III et al.
7,230,181 B2 6/2007 Simmons et al.
7,587,796 B1 9/2009 Schultz
7,713,073 B2 5/2010 Lin
8,029,302 B1 10/2011 Duan
8,491,330 B2 7/2013 McSweyn
8,536,827 B2 9/2013 Gourley
8,790,125 B1 7/2014 Lee
8,870,601 B2 10/2014 Lee
9,350,150 B2 5/2016 Clark-Mantle
9,445,178 B2 9/2016 Rothbaum et al.
9,559,472 B2 1/2017 Chien
9,787,808 B1 10/2017 Gyasi
2006/0073730 A1 4/2006 Morrison
2006/0141846 A1 6/2006 Davis
2014/0094065 A1 * 4/2014 Martin .................. H01R 13/72 439/638
2014/0346311 A1 11/2014 Derman
2015/0325940 A1 11/2015 Foseide
(Continued)

*Primary Examiner* — Bryce M Aisaka
(74) *Attorney, Agent, or Firm* — John Rizvi; John Rizvi, P.A.—The Patent Professor®

(57) ABSTRACT

An electronic device charger accessory suitable for enclosing and securing a power adapter to a charger cord for an electronic device may include an adapter enclosure having an interior sized and configured to enclose a power adapter of a device charger cable. A first opening may be provided in the adapter enclosure in communication with the interior of the adapter enclosure. A flexible link may extend from the adapter enclosure. A connector sleeve may be carried by the link. The connector sleeve may have an interior sized and configured to enclose a first connector of the device charger cable, and may further include a first opening communicating with the interior of the connector sleeve. The link may be flexed to place the connector sleeve against the adapter enclosure such that a cable connector can be extended through both first openings.

20 Claims, 9 Drawing Sheets

(56) References Cited

U.S. PATENT DOCUMENTS

| | | | | |
|---|---|---|---|---|
| 2016/0197436 | A1 | 7/2016 | Barker et al. | |
| 2016/0204550 | A1 | 7/2016 | Jennings | |
| 2017/0149175 | A1 * | 5/2017 | Balest .................... | H01R 31/00 |

* cited by examiner

ELECTRONIC DEVICE CHARGER ACCESSORY

CROSS-REFERENCE TO RELATED APPLICATIONS

This application claims the benefit of U.S. Provisional Patent Application No. 63/034,481, filed on Jun. 4, 2020, which is incorporated by reference herein in its entirety.

FIELD OF THE INVENTION

The present invention relates generally to electronic device chargers, and more particularly, to an electronic device charger accessory which encloses and secures a power adapter to a charger cord for an electronic device.

BACKGROUND OF THE INVENTION

Wiring cables are commonly used to transmit data and/or electricity to and from a personal electronic device such as a smartphone, tablet or the like. In many instances, a cable from one personal electronic device is connected to a cable from another personal electronic device. In other applications, a device may require periodic recharging by connecting the device to a source of electrical power. A wiring cable may be used to transfer recharging electrical current from the electrical power source to the device.

A typical wiring cable used to connect a personal electronic device to an electrical wall outlet may include a wall charger/adapter or power adapter. The power adapter may include an adapter body. A pair of electrical prongs may extend from a front surface of the adapter body. A connector opening may extend into a rear surface of the adapter body. The electrical prongs may be configured for insertion into the electrical wall outlet. The connector opening electrically interfaces with the electrical prongs.

A device charger cable may terminate on one end with a first connector and on the other end with a second connector. The first connector may be insertable into the connector opening in the adapter body of the power adapter. The second connector may be insertable into the cable port on the personal electronic device. Accordingly, electrical power which recharges the personal electronic device flows from the electrical wall outlet to the personal electronic device through the electrical prongs, adapter body, first connector, device charger cable and second connector, respectively. After recharging of the personal electronic device is completed, the second connector of the device charger cable.

In some instances, a user of a personal electronic device may desire to the use the device as the device is being charged. The user of the device must therefore find an electrical wall outlet which is within proximity to the chair, table or other area at which the user desires to use the device. One of the limitations of the conventional device charger cable is that the cord may not have a sufficient length to reach from the electrical wall outlet to the device as the user uses the device.

Another limitation of using a conventional device charger cable to recharge a device is that the cord may have a tendency to become tangled. This may particularly be the case in applications in which the electrical wall outlet into which the cord is plugged and the table or other support on which the device rests during recharging are within close proximity to each other.

In a conventional device charger cable, the first connector on the cord is removably inserted in the connector opening in the adapter body of the power adapter. When the power adapter is not in use, the first connector of the device charger cable may be removed from the connector opening in the adapter body. The device charger cable and/or the power adapter may become misplaced and difficult to locate when the user desires to recharge his or her personal electronic device.

Personal electronic devices and device charger cables may be vulnerable to water. In some applications, personal electronic devices may be recharged in a wet environment. This, however, may present a safety hazard to the user and may damage the components of the device charger cable. Keeping water away from the exposed electric connections between the components of the device charger cable may be challenging.

Accordingly, there is need for an electronic device charger accessory which encloses and secures a power adapter to a charger cord for a personal or other electronic device.

SUMMARY OF THE INVENTION

The present invention is directed to an electronic device charger accessory which encloses and secures a power adapter to a charger cord for an electronic device. The electronic device charger accessory may include an adapter enclosure. The adapter enclosure may have an interior. The interior of the adapter enclosure may be sized and configured to enclose a power adapter of a device charger cable. A first opening in the adapter enclosure may communicate with the interior. A flexible link may extend from the adapter enclosure. A connector sleeve may terminate the link. The connector sleeve may have an interior. A first opening in the connector sleeve may communicate with the interior of the connector sleeve. The interior of the connector sleeve may be sized and configured to enclose a first connector of the device charger cable.

In a first implementation, an electronic device charger accessory may include an adapter enclosure, comprising an interior configured to receive a power adapter. A front side of the adapter enclosure may include a first opening communicating with the interior of the adapter enclosure. The accessory may further include a flexible link extending from a front end of the adapter enclosure, and a connector sleeve carried by the link. The connector sleeve may include an interior configured to receive a first connector of a device charger cable. A front side of the connector sleeve may be provided with a first opening communicating with the interior of the connector sleeve. The electronic device charger accessory may be selectively positionable, by deforming the link, into a first position and a second position. In the first position of the accessory, the link may be arranged in an extended position and the adapter enclosure and connector sleeve may be arranged in a spaced-apart relationship with one another. In the second position, the link may be flexed towards the adapter enclosure, and the first opening of the connector sleeve may be arranged adjacent to and facing the first opening of the adapter enclosure; in addition, the interior and first opening of the adapter enclosure and the interior and first opening of the connector sleeve may be aligned to receive a first connector of the device charger cable.

In a second aspect, the link may extend from a front end of the connector sleeve.

In another aspect, the link may be elastically flexible.

In another aspect, the link may be planar.

In another aspect, a front side of the link may be coplanar with a front side of the adapter enclosure and/or a front side of the connector sleeve.

In yet another aspect, the adapter enclosure, connector sleeve and link may be integrally formed into a single-piece unit.

In another aspect, the adapter enclosure may be elastically stretchable.

In another aspect, the connector sleeve may be elastically stretchable.

In another aspect, in the second position, a space may be defined between the link and the front side of the adapter enclosure. The space may be sized to fit one or more sections of the device charger cable, with the one or more sections vertically enclosed within the space by the link and by the first connector of the device charger cable when the first connector is arranged extending through the first openings of the adapter enclosure and connector sleeve.

In yet another aspect, the electronic device charger accessory may further include a cord wrap extending from the adapter enclosure.

In another aspect, the cord wrap may include a first portion configured for the wrapping thereon of a cord, and a second portion wider than and arranged outward of the first portion for retaining the wrapped cord at the first portion.

In another aspect, the cord wrap may extend from the top side of the adapter enclosure, and may be opposite to the connector sleeve when the electronic device charger accessory is arranged in the first position.

In another aspect, the electronic device charger accessory may further include a pair of earbud holders extending from the adapter enclosure.

In yet another aspect, the pair of earbud holders may extend from opposite left and right sides of the adapter enclosure.

In another aspect, each of the earbud holders may be tubular.

In another aspect, the adapter enclosure may further include a second opening on a rear side of the adapter enclosure, the second opening communicating with the interior of the adapter enclosure for receiving a housing of the power adapter into the interior of the adapter enclosure through the second opening.

In another aspect, the connector sleeve may further include a second opening, the second opening communicating with the interior of the connector sleeve and configured for the passage therethrough of a second connector of the device charger cable.

In yet another aspect, the second opening may be smaller than the first opening of the connector sleeve and may be configured to prevent the passage therethrough of the first connector of the device charger cable.

In some embodiments, the power adapter of the device charger cable may be placed in the interior of the adapter enclosure with the first opening in the power adapter in alignment or registration with the first opening in the adapter enclosure. The first connector of the device charger cable may be inserted into the interior of the connector sleeve. The electronic device charger accessory may be deployed from an extended configuration to a space-efficient configuration by folding the link upwardly to align or register the first connector of the device charger cable with the first opening in the adapter enclosure and facilitate insertion of the first connector into the first opening in the power adapter. The electronic device charger accessory may facilitate water-resistant enclosure of the power adapter and space-efficient connection between the first connector and the power adapter while maintaining a secure connection between the first connector and the power adapter when the device charger cable is not in use.

In some embodiments of the electronic device charger accessory, the adapter enclosure may be sized and configured to enclose two power adapters. A pair of connector sleeves may be connected to the adapter enclosure via separate links. The connector sleeves may accommodate separate device charger cables for simultaneous charging of separate electronic devices.

In some embodiments of the electronic device charger accessory, a power cord may extend from the adapter enclosure. A power cord plug may terminate the power cord. The first opening in the adapter enclosure may electrically interface with the power cord. The power cord plug may be plugged into an electrical wall outlet. The first connector of the device charger cable may be inserted in the connector sleeve. The link may be folded upwardly to facilitate insertion of the first connector through the first opening.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward an electronic device charger accessory which encloses and secures a power adapter to a charger cord for an electronic device.

Figure 3:
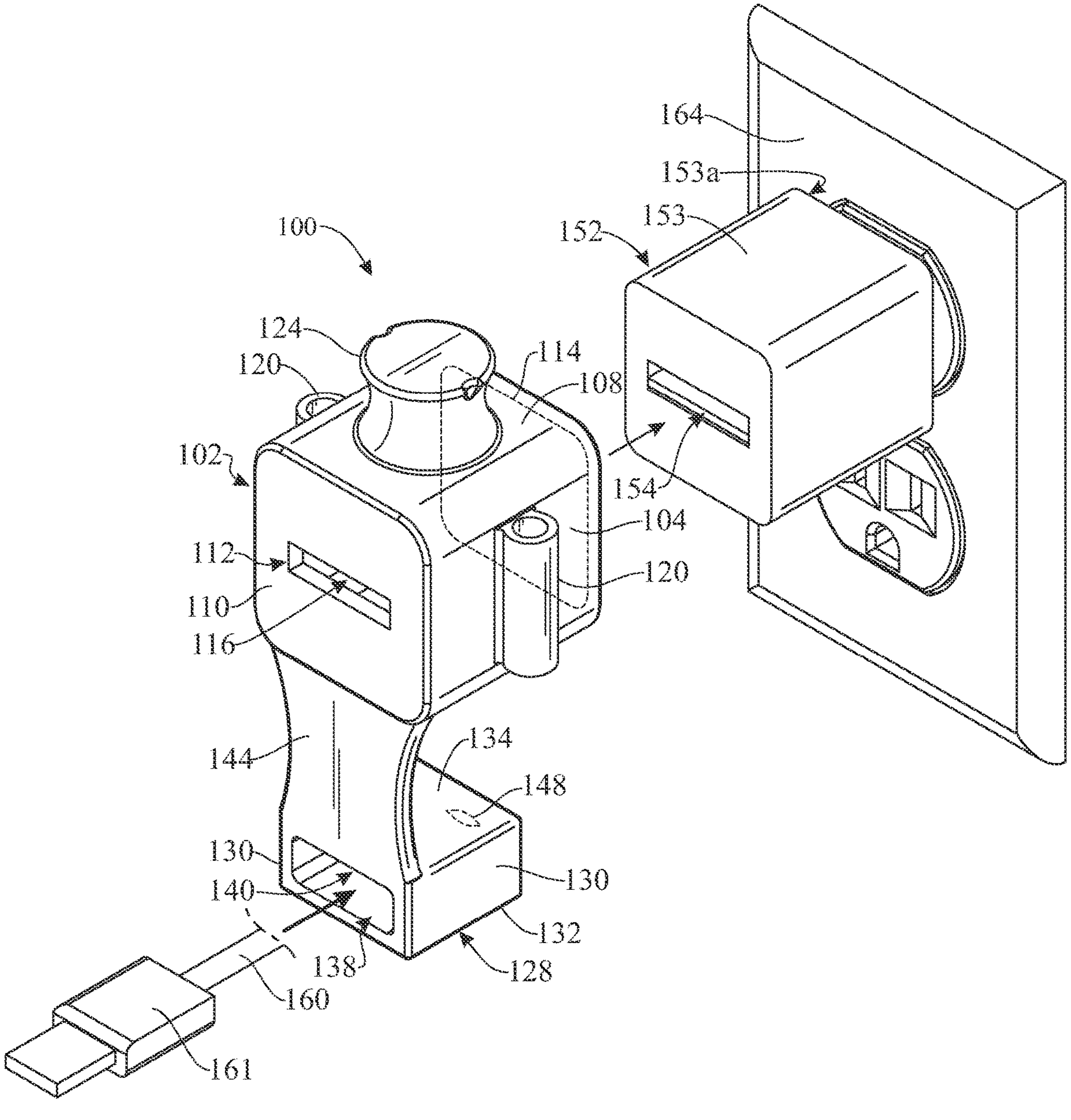
FIG. 3 presents an exploded perspective view illustrating insertion of a power adapter into the adapter enclosure and insertion of a first connector into the connector sleeve in application of the illustrative electronic device charger accessory in FIG. 1.
Figure 4:
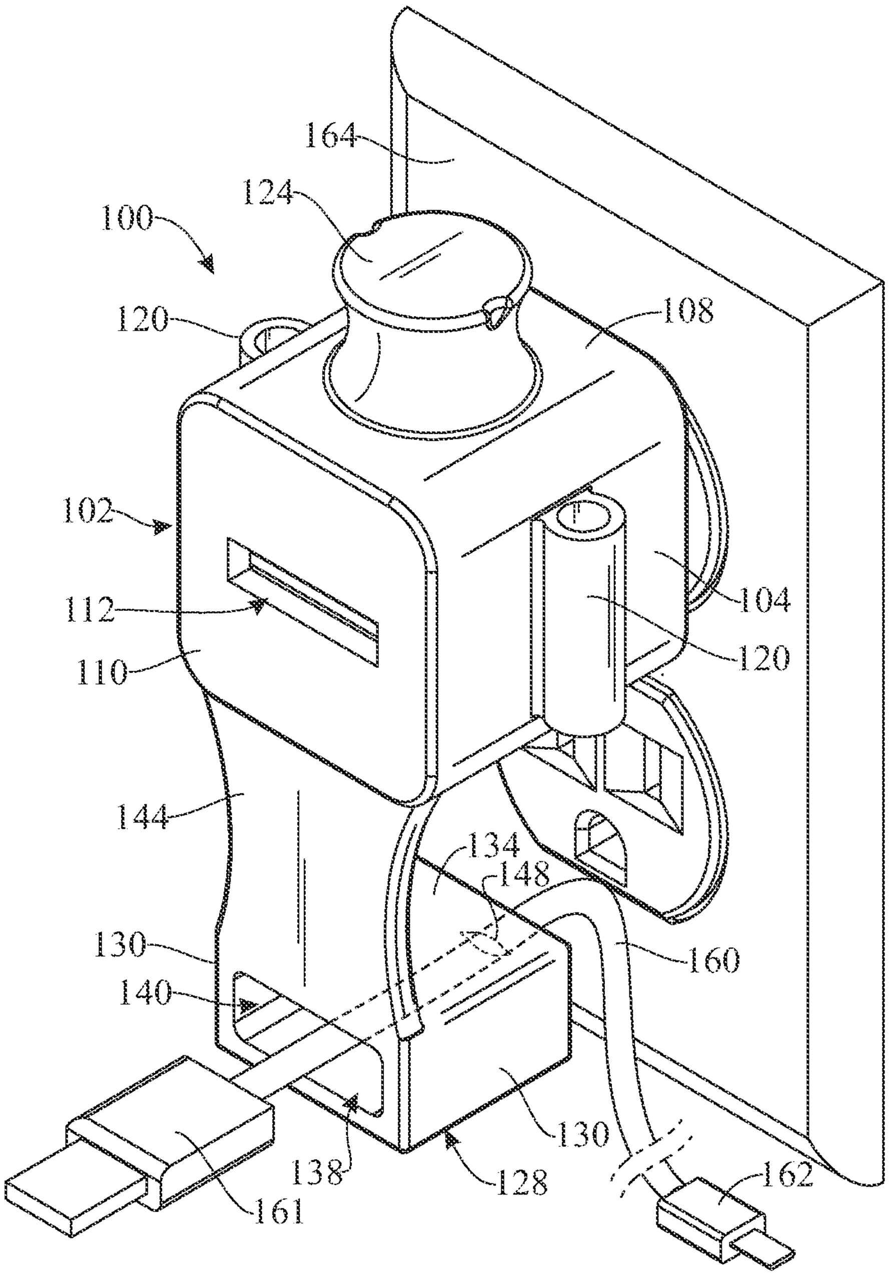
FIG. 4 presents a front perspective view of the illustrative electronic device charger accessory in FIG. 1, with the power adapter contained in the adapter enclosure and the first connector contained in the connector sleeve in application of the illustrative electronic device charger accessory.
Figure 5:
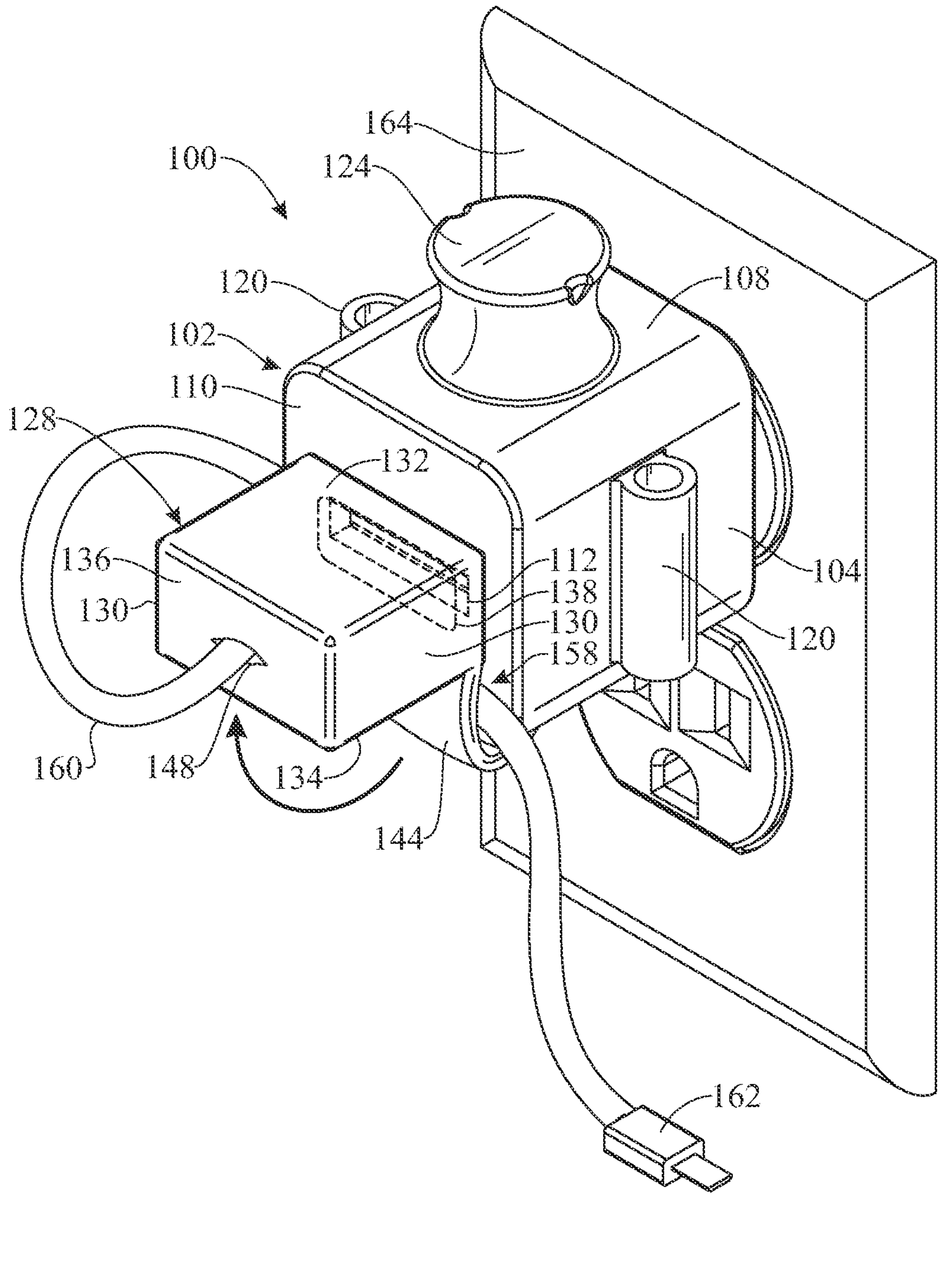
FIG. 5 presents a front perspective view of the illustrative electronic device charger accessory deployed in the space-efficient configuration, with the link folded upwardly and the first connector (not shown) in the connector sleeve inserted in the power adapter (not shown) in the adapter enclosure.

Referring initially to FIGS. 1-7, an electronic device charger accessory 100 is illustrated in accordance with a first exemplary embodiment of the present invention. The electronic device charger accessory 100 may be used to cover, and/or facilitate use of, an electronic device power adapter 152 (FIG. 3) and a device charger cable 160 connectable or permanently connected to the power adapter 152. The power adapter 152 may consist of a housing, box, or other enclosure, hereinafter referred to as generically as housing 153, containing one more transformers and other hardware configured to convert electrical power available on a wall outlet 164 to an adequate DC power to charge one or more electronic devices. The power adapter 152 may include at least one cable connector 154 (FIG. 3) and a pair of spaced-apart electrical prongs 156 (FIG. 7) or other prong combination configured to connect to a wall outlet providing electrical power (usually, AC power) to the power adapter 152. The at least one cable connector 154 may be typically female, although male connectors may also be included. For example, the present power adapter 154 includes a single, female slot-shaped cable connector (e.g., a USB port such as, but not limited to, USB-A, USB-B or USB-C). In turn, the device charger cable 160 may be terminated on opposite ends by a first connector 161 and a second connector 162 (FIG. 5). The first connector 161 is configured to couple or engage with the cable connector 154 of the power adapter 152, and the second connector 162 is configured to connect to an electrical device such that the electrical device may be charged via the power adapter 152 and device charger cable 160. In non-limiting examples of the invention, the second connector 162 may be a lightning connector, a USB port (e.g., USB-A, USB-B, USB-C, USB Mini-A, USB Mini-B, USB Micro-A, USB Micro-B, etc.).

Figure 1:
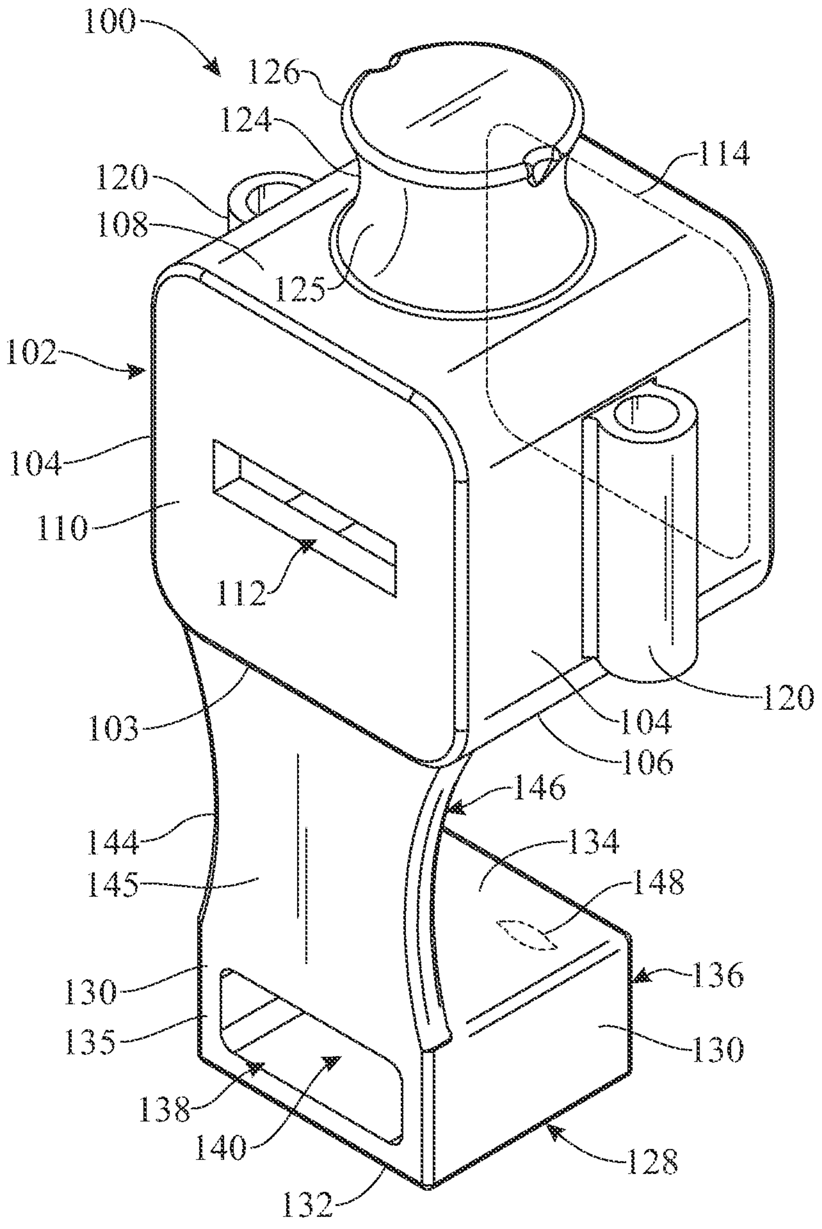
FIG. 1 presents a front perspective view of an electronic device charger accessory deployed in the extended configuration in accordance with a first illustrative embodiment of the present invention.

Turning to FIG. 1, the electronic device charger accessory 100 of the present disclosure comprises an adapter enclosure 102 configured to attach to, and preferably snugly fit on and cover, the housing 153 of the power adapter 152. A connector sleeve 128 may be movably carried by or connected to the adapter enclosure 102. The connector sleeve 128 may be suitably sized and configured to receive or accommodate, in a preferably snugly manner, the first connector 161 of the device charger cable 160. The connector sleeve 128 may be connected to the adapter enclosure 102 by at least one elongated link, strap, panel, member, body or connector, hereinafter referred to as link 144. The link 144 is flexible and deformable, as shown for instance in FIG. 5, and is preferably elastically-flexible such that when deforming or flexing forces cease, the link 144 tends to recover a straight or extended, default position, shown for instance in FIG. 1. In some embodiments, such as the present embodiment, the link 144 may be generally flat and relatively thin, and may include a front side 145 and a rear side 146 formed generally parallel to one another.

The adapter enclosure 102, connector sleeve 128, link 144 and other components of the electronic device charger accessory 100 may be fabricated of plastic, rubber or other flexible or semi-flexible material(s). In one preferred embodiment, the electronic device charger accessory 100 may be manufactured into a single-piece unit, such as made of rubber, silicone, or another flexible material.

Figure 2:
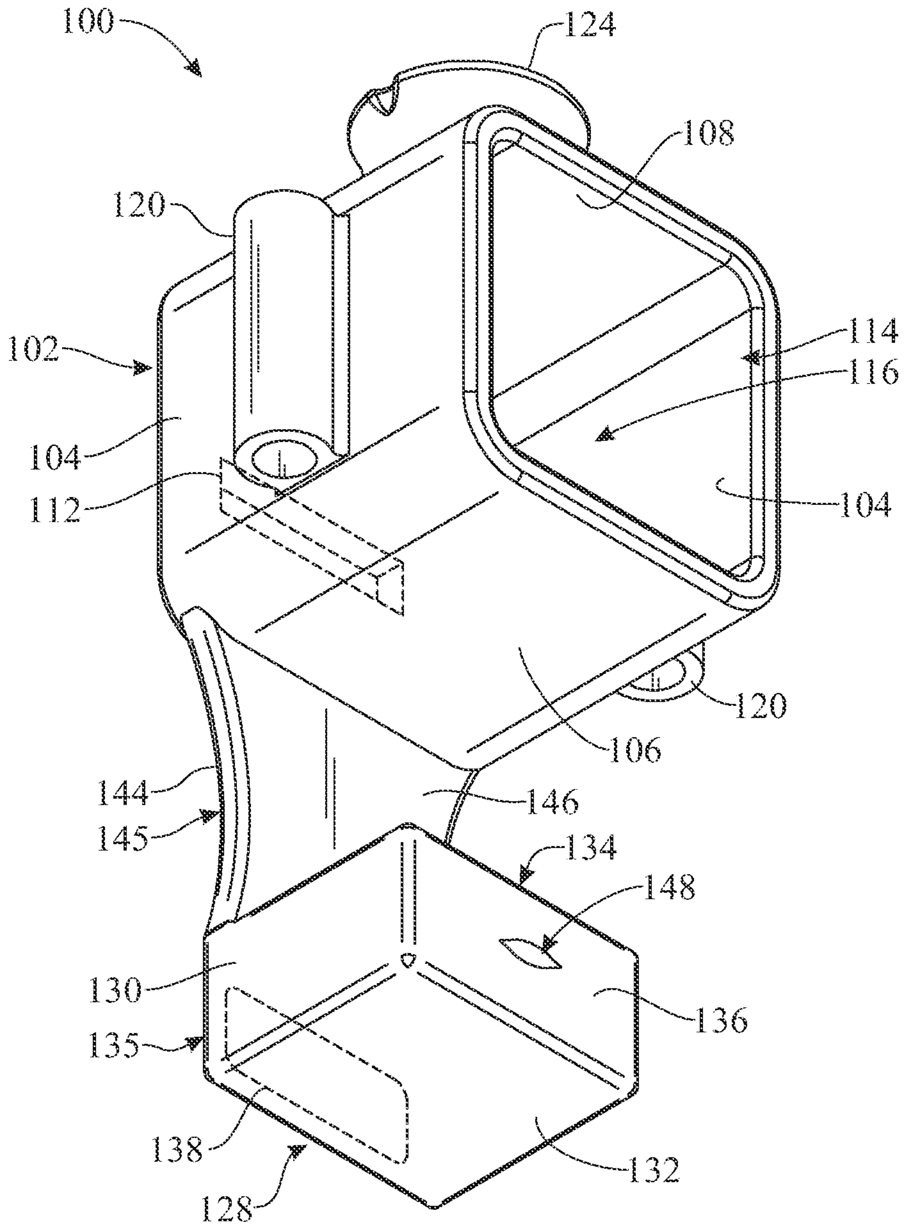
FIG. 2 presents a rear perspective view of the illustrative electronic device charger accessory illustrated in FIG. 1.

In different embodiments of the invention, the shape and size of the adapter enclosure 102 may vary to adjust to and cover different power adapter models. In some embodiments, such as the present embodiment, the adapter enclosure 102 is generally rectangular or cubical, and may include rounded edges. As shown in FIGS. 1 and 2, the adapter enclosure 102 may include a front side or panel 110, a pair of spaced-apart sides or side panels 104 extending rearward from the front panel 110, a bottom side or panel 106, and a top side or panel 108, the bottom and top panels 106 and 108 extending rearward from the front panel 110 between the side panels 104. In the generally rectangular or cubical embodiment, the side panels 104 may be parallel to one another, the top and bottom panels 108 and 106 may be parallel to one another, and all four panels 104, 106, 108 may be generally perpendicular to the front panel 110. However, alternative adapter enclosure shapes and configurations are contemplated without departing from the scope of the present disclosure.

With continued reference to FIG. 1, the link 144 may extend from a front bottom edge 103 of the adapter enclosure 102. i.e., the link 144 may extend substantially from an area of the adapter enclosure 102 at which the front panel 110 and bottom panel 106 meet or connect with one another. For example, as shown, the link 144 may be attached to and extend from the bottom panel 106 at or adjacent to the front panel 110. Having the link 144 extend from this front bottom edge 103 or area at which the front and bottom panels 110 and 106 meet may facilitate a short length of the link 144 between the adapter enclosure 102 and the connector sleeve 128, and also contribute to having a cleaner bottom area when the invention is being used as shown in FIG. 5 and described in greater detail hereinafter.

As illustrated in FIG. 2, a second opening 114 may be formed by and between the side panels 104, the bottom panel 106 and the top panel 108 in communication with the interior 116 of the adapter enclosure 102. The second opening 114 may be positioned at a rear end of the adapter enclosure 102, opposite the front panel 110. In some embodiments, such as the present embodiment, the second opening 114 is formed on a plane that is parallel to the front panel 110. The second opening 114 is configured to allow the housing 153 of the power adapter 152 to be received into the interior 116 of the adapter enclosure 102. As shown in FIG. 4, the adapter enclosure 102 is shaped and sized to fit onto and cover the housing 153 of the power adapter 152 practically entirely. A rear side 153*a* of the housing 153, from which the electrical prongs 156 (FIG. 7) protrude, is configured to face the second opening 114 and thereby face the wall outlet 164. In some embodiments, the adapter enclosure 102 may be shaped and side such that said rear side 153*a* of the housing 153 protrudes outwardly from the housing 153 when the housing 153 of the power adapter 152 is fitted into the adapter enclosure 102. In other embodiments, the interior 116 of the adapter enclosure 102 may be configured to receive the entire housing 153.

As illustrated in FIG. 1, a first opening 112 may be provided in the adapter enclosure 102. In some embodiments, the first opening 112 may extend through the front panel 110 opposite the second opening 114 (FIG. 2). The first opening 112 may be suitably sized and configured to receive the first connector 161 (FIG. 3) of the device charger cable 160. For instance, in the present embodiment, the first opening 112 has an elongated, slot-shaped, rectangular transverse cross-section generally matching the transverse cross-section of the first connector 161 of the device charger cable 160 and the transverse cross-section of the cable connector 154 of the power adapter 152. However, alternative shapes are contemplated without departing from the scope of the present disclosure, as long as the first connector 161 may be plugged into the cable connector 154 of the power adapter 152 through the first opening 112.

In some embodiments, the connector sleeve 128 may include a front side or panel 135, a rear side or panel 136 (FIG. 2), a pair of spaced-apart sides or side panels 130 extending forwardly from the rear panel 136, and bottom and top sides or panels 132 and 134, respectively, extending forwardly from the rear panel 136 between the side panels 130. As illustrated in FIG. 3, an interior 140 of the connector sleeve 128 may be formed by and between the side panels 130, the bottom panel 132 and the top panel 134. The link 144 may extend between the adapter enclosure 102 and a front end of the connector sleeve 128 opposite to the rear panel 136; for example, the link 144 may extend from a front end or edge of the top panel 134 of the connector sleeve 128, as shown. In some embodiments, such as the present embodiment, the front side 145 of the link 144 may be coplanar with the front side or panel 135 of the connector sleeve 128. Alternatively or additionally, though not shown, the front side 145 of the link 144 may be coplanar or flush with the front panel 110 of the adapter enclosure 102. In some embodiments, such as the present embodiment, the connector sleeve 128 may be generally rectangular, with the side panels 130 arranged generally parallel to one another and the bottom and top panels 132 and 134 arranged generally parallel to one another. However, alternative embodiments are contemplated without departing from the scope of the present disclosure.

As illustrated in FIG. 1, a first opening 138 may be provided in the connector sleeve 128 in communication with the interior 140 of the connector sleeve 128. In some embodiments, the first opening 138 may be positioned at the front side or panel 145 of the connector sleeve 128, opposite the rear panel 136. In turn, as illustrated in FIG. 2, a second opening 148 may extend through the rear panel 136 in communication with the interior 140. The second opening 148 may be positioned opposite the first opening 138. The first opening 138 may be suitably sized and configured to facilitate extension or protrusion of the first connector 161 (FIG. 3) of the device charger cable 160 from the interior 140 when the first connector 161 is disposed in the interior 140. In turn, the second opening 148 may be sized and configured to receive and facilitate passage of the device charger cable 160 and second connector 162 from the first connector 161 when the first connector 161 is disposed in the interior 140 of the connector sleeve 128. In different embodiments, the shape and size of the first opening 138 and second opening 148 may or may not be the same. In the present embodiment, for instance, the first opening 138 is larger than the second opening 148; however, alternative constructions are contemplated, such as having both openings 138, 148 shaped and sized as the first opening 138 in order to allow insertion of the device charger cable 160 into the interior 140 of the connector sleeve 128 in any given direction (rearward or frontward). Furthermore, in some embodiments, such as the present embodiment, the second opening 148 is not only smaller than the first opening 138 but also is smaller than the first connector 161 of the device charger cable 160; i.e., the second opening 148 is configured to prevent the passage therethrough of the first connector 161 such that the rear panel 136 of the connector sleeve 128 may prevent the device charger cable 160 from being pulled out of the connector sleeve 128 and may retain the device charger cable 160 and first connector 161 within the interior 140 of the connector sleeve 128.

It must be noted that the shape and size of the first openings 112, 138 and of the interior 140 of the connector sleeve 128 may vary in different embodiments of the invention, such as to accommodate different first connectors 161 of different device charger cables 160. For example, in some embodiments, the interior 140 of the connector sleeve 128 and the first openings 112, 138 may be elongate and rectangular, and configured to accommodate a male USB connector, as shown. Similarly, the shape and size of the second opening 148 of the connector sleeve 128 may vary in different embodiments of the invention, such as to accommodate different device charger cables 160, different second connectors 162 thereof, and optionally different first connectors 161 thereof, as described heretofore. For instance, in the present embodiment, the second opening 148 is configured to allow the passing therethrough of the device charger cable 160 and also of a USB Type-C, lightning-type, or similar second connector 162 that is slightly wider than the device charger cable 160 and smaller than the first connector 161.

Figure 7:
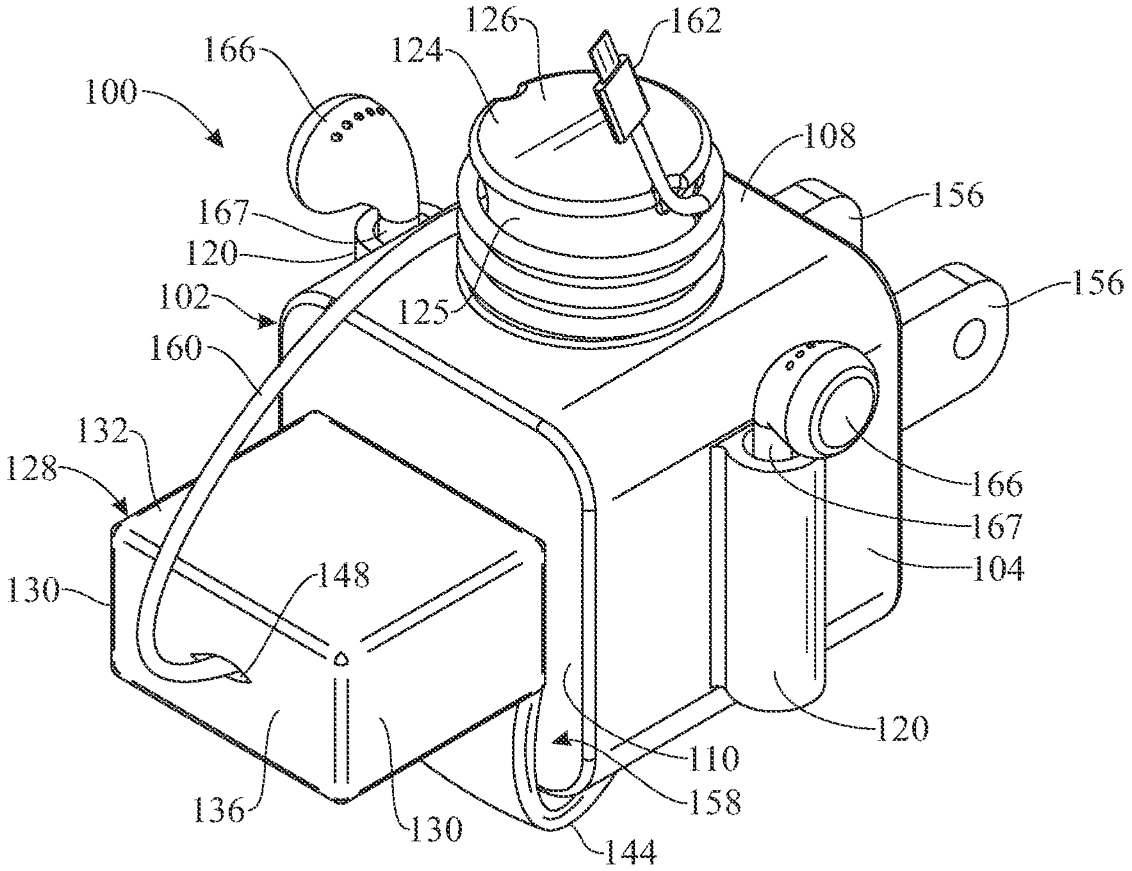
FIG. 7 presents a front perspective view of the illustrative electronic device charger accessory deployed in the space-efficient configuration and the power adapter removed from the electric wall outlet.

As illustrated in FIG. 7, in some embodiments, the electronic device charger accessory 100 may include at least one cord wrap 124 extending from the adapter enclosure 102 to facilitate space-efficient storage of the device charger cable 160. The cord wrap 124 may extend from an area of the adapter enclosure 102 opposite to the connector sleeve 128 when the link 144 is in the default, extended position of FIG. 3. For example, the cord wrap 124 may extend from the top panel 108 of the adapter enclosure 102. As shown in FIGS. 1 and 7, the cord wrap 124 may be formed as a protrusion having a first portion 125 configured for the wrapping thereon of the device charger cable 160, wherein the second portion 126 is wider than the first portion 125 and is arranged outward of the first portion 125 relative to the base of the cord wrap 124 (i.e., relative to the top panel 108) to retain the device charger cable 160 in the wrapped position (FIG. 7).

As further illustrated in FIG. 7, in some embodiments, the electronic device charger accessory 100 may be configured to facilitate space-efficient storage of a pair of earbuds 166. As best shown in FIG. 1, a pair of earbud holders 120 may extend from the adapter enclosure 102 to facilitate space-efficient storage of the earbuds 166. In some embodiments, the earbud holders 120 may extend from the respective side panels 104 of the adapter enclosure 102. Each of the earbud holders 120 may be tubular in shape, and configured to receive a stem 167 of the corresponding earbud 166. In some embodiments, such as the present embodiment, the earbud holders 120 may have open top and bottom ends, as shown, to facilitate inserting the earbuds 166 through either end, to facilitate storage of the earbuds 166 together with the electronic device charger accessory 100 in a wider variety of configurations.

An example of operation of the electronic device charger accessory 100 is illustrated in FIGS. 3-7 of the drawings. With reference initially to FIG. 3, in this application of the electronic device charger accessory 100, the power adapter 152 of the device charger cable 160 may be plugged into an electric wall outlet 164. The adapter enclosure 102 may be placed over the power adapter 152 as the power adapter 152 inserts through the second opening 114 into the interior 116 of the adapter enclosure 102; in some embodiments, the adapter enclosure 102 may be elastically stretchable to facilitate fitting the adapter enclosure 102 onto the housing 153 of the power adapter 152 by slightly stretching out the adapter enclosure 102 and then facilitate snug fitting of the adapter enclosure 102 onto the housing 153 by ceasing to stretch out the adapter enclosure 102. The device charger cable 160 may be fitted through the connector sleeve 128. Fitting the device charger cable 160 through the connector sleeve 128 may be carried out with the link 144 in an extended position, such as that of FIG. 3. As shown in FIG. 4, once the device charger cable 160 is fitted through the connector sleeve 128, the first connector 161 and second connector 162 of the device charger cable 160 extend outward of the first opening 138 and second opening 148, respectively, of the connector sleeve 128. The first connector 161 may then be partially inserted into the interior 140 of the connector sleeve 128; in some embodiments, the connector sleeve 128 may be elastically stretchable to facilitate fitting the connector sleeve 128 onto the first connector 161 of the device charger cable 160 by slightly stretching out the connector sleeve 128 and then facilitate snug fitting of the connector sleeve 128 onto the first connector 161 by ceasing to stretch out the connector sleeve 128.

Figure 6:
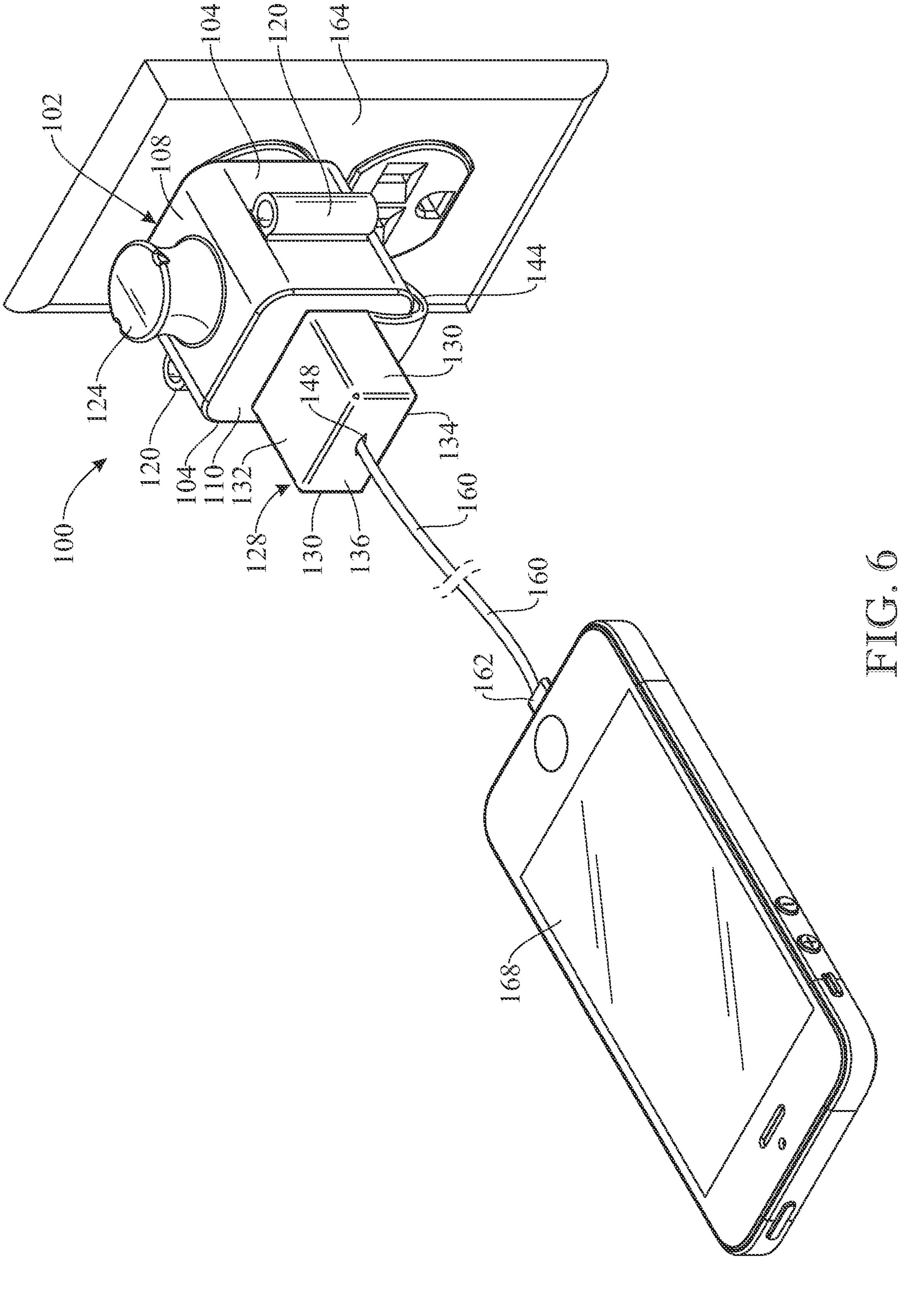
FIG. 6 presents a front perspective view of the illustrative electronic device charger accessory deployed in the space-efficient configuration and an electronic device connected to the second connector of the device charger cable.

As illustrated in FIG. 5, the electronic device charger accessory 100 may be deployed from the extended configuration (FIG. 4) to a folded, space-efficient configuration by folding or flexing the link 144 upwardly from the extended position of FIG. 4 to a folded or upwardly directed position. The connector sleeve 128 is thereby moved from the first, hanging or spaced-apart position relative to the adapter enclosure 102 to a second position, in which the connector sleeve 128 is adjacent to the adapter enclosure 102, as shown in FIG. 5. In the second position of the connector sleeve 128, the first opening 138 in the connector sleeve 128 faces the first opening 112 in the adapter enclosure 102, as shown. As it protrudes from the first opening 138, the first connector 161 of the device charger cable 160 may then be inserted through the first opening 112 in the adapter enclosure 102 and into the cable connector 154 in the power adapter 152. As illustrated in FIG. 6, the second connector 162 of the device charger cable 160 may in turn be inserted in a power port in an electronic device 168. Recharging electrical current may flow from the electric wall outlet 164 through the power adapter 152, first connector 161, device charger cable 160 and second connector 162, respectively, into the electronic device 168 to recharge the electronic device 168. It will be appreciated that in the folded, space-efficient configuration illustrated in FIGS. 5-7, the electronic device charger accessory 100 facilitates space-efficient recharging of the electronic device 168. Moreover, the adapter enclosure 102 and the connector sleeve 128 may impart a substantially watertight seal with the respective power adapter 152 and first connector 161 to protect these components from water contact and damage during use.

When recharging of the electronic device 168 is completed, the power adapter 152 may be unplugged from the wall outlet 164. As illustrated in FIG. 7, the electronic device charger accessory 100 may remain in the folded, space-efficient configuration to facilitate space-efficient storage of the electronic device charger accessory 100. The device charger cable 160 may remain connected to the power adapter 152 to prevent inadvertent separation and misplacement of those components.

As further illustrated in FIG. 7, in some applications, space-efficient stowage or deployment of the device charger cable 160 can be facilitated by wrapping the device charger cable 160 around the cord wrap 124. A pair of earbuds 166 can be stowed on the electronic device charger accessory 100 by placement of the earbuds 166 in the respective earbud holders 120.

Furthermore, as shown in FIGS. 5 and 7, when the link 144 is arranged in the folded position and the first connector 161 of the device charger cable 160 extends through the aligned first openings 112 and 138 and is plugged into the cable connector 154 of the power adapter 152, a space 158 is formed between the front panel 110 of the adapter enclosure 102 and the folded or looped link 144, and beneath the first connector 161. As shown in FIG. 5, said space 158 may receive the device charger cable 160 therethrough, while the first connector 161 and the folded link 144 retain the cable vertically within the space 158. In some embodiments or applications, the user may even be able to loop the device charger cable 160 so that it extends through the space more than once, further saving space. In addition, having the link extend from a front bottom edge or end of the adapter enclosure 102 may contribute not only to compactness of the electronic adapter accessory 100, but also to provide a tighter space 158 for better adjustment of the one or more loops of device charger cable 160 within the space 158.

Figure 8:
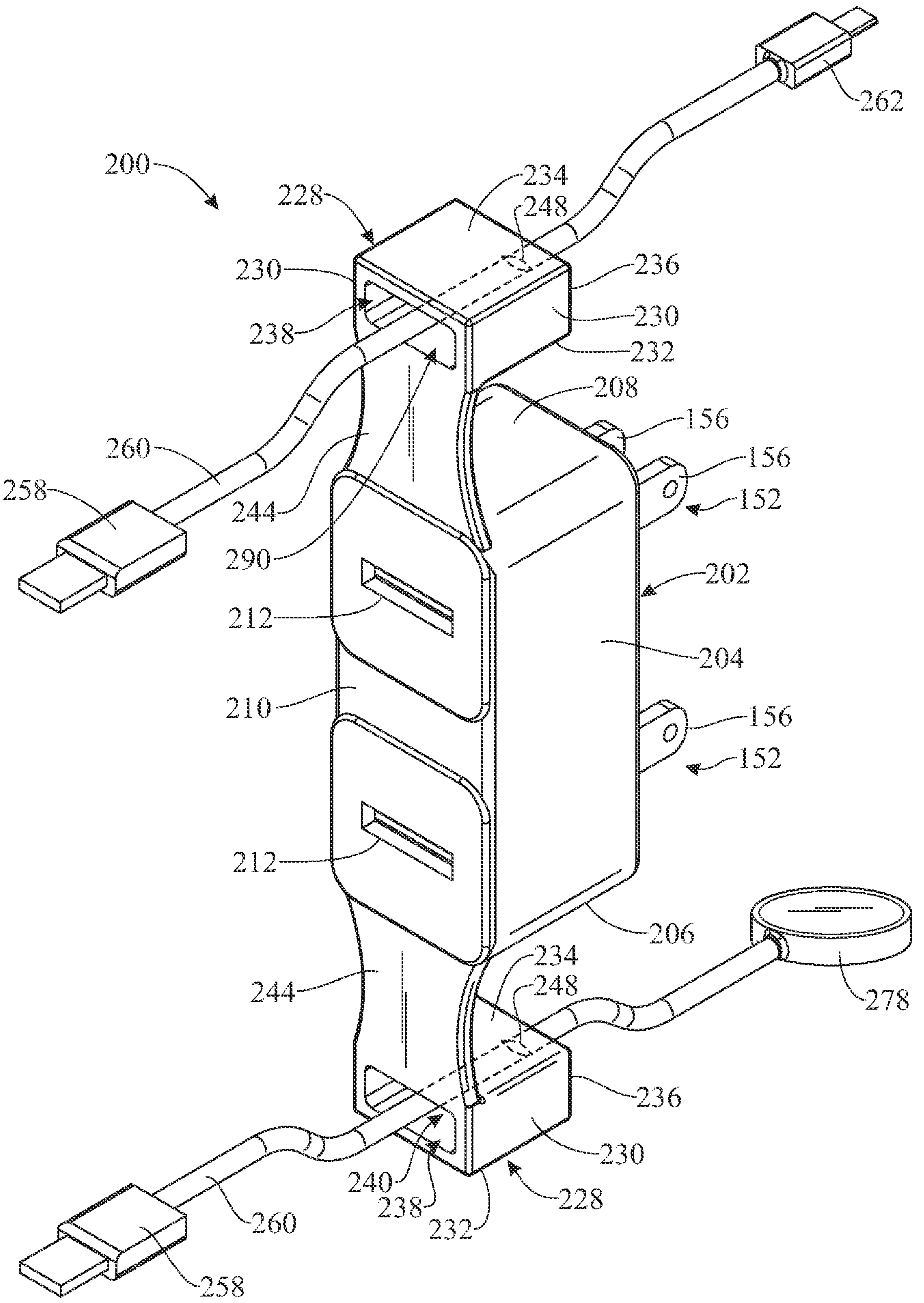
FIG. 8 presents a front perspective view of an electronic device charger accessory deployed in the extended configuration in accordance with a second illustrative embodiment of the present invention.

Referring next to FIG. 8 of the drawings, an alternative illustrative embodiment of the electronic device charger accessory is generally indicated by reference numeral 200. In the electronic device charger accessory 200, elements which are analogous to the respective elements of the electronic device charger accessory 100 that was heretofore described with respect to FIGS. 1-7 are designated by the same respective numerals in the 200-299 series in FIG. 8. The adapter enclosure 202 of the electronic device charger accessory 200 may be generally elongated in shape and may be suitably sized and configured to contain two power adapters 152, with the electrical prongs 156 of the power adapters 152 protruding outwardly of the adapter enclosure 202. A pair of first openings 212 may be provided in the adapter enclosure 202 for alignment or registration with the cable connectors 154 (FIG. 3) in the respective power adapters 152. A pair of links 244 may extend from the respective front edge of a bottom panel 206 and bottom panel 208 of the adapter enclosure 202. A pair of connector sleeves 228 may be provided on the respective links 244.

Application of the electronic device charger accessory 200 may be as was heretofore described with respect to application of the electronic device charger accessory 100 in FIGS. 3-7. The connector sleeves 228 may accommodate separate device charger cables 260 to facilitate simultaneous recharging of separate electronic devices 168 (FIG. 6). For example and without limitation, in some applications, one device charger cable 260 may be used to recharge a smartphone whereas the other device charger cable 260 may facilitate wireless recharging of a watch or other electronic device using a wireless charger 278, which may be standard or conventional.

Figure 9:
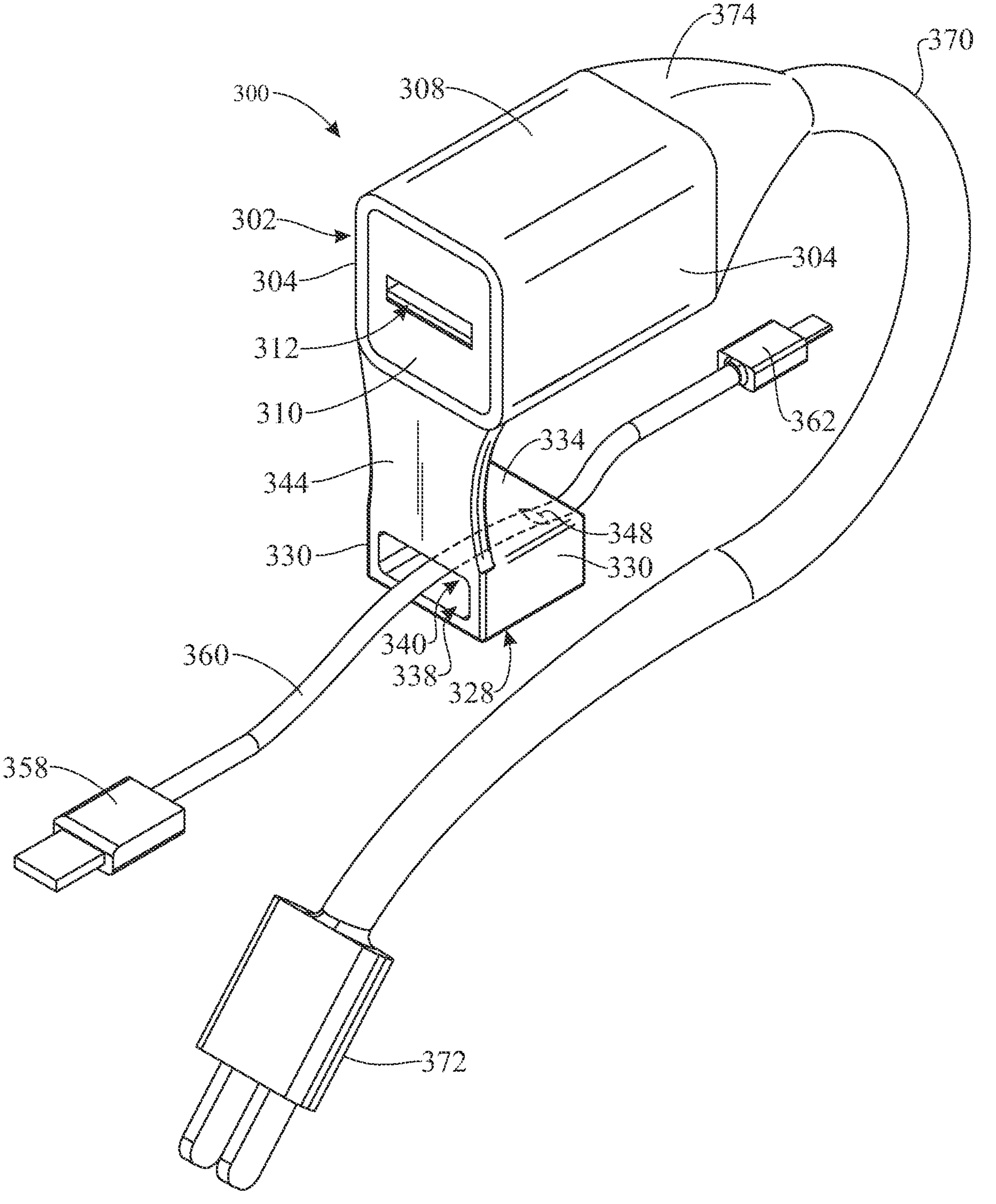
FIG. 9 presents a front perspective view of an electronic device charger accessory deployed in the extended configuration in accordance with a third illustrative embodiment of the present invention.

Referring next to FIG. 9 of the drawings, another alternative illustrative embodiment of the electronic device charger accessory is generally indicated by reference numeral 300. In the electronic device charger accessory 300, elements which are analogous to the respective elements of the electronic device charger accessory 100 that was heretofore described with respect to FIGS. 1-7 are designated by the same respective numerals in the 300-399 series in FIG. 9. An AC cable 370 may extend from the adapter enclosure 302 of the electronic device charger accessory 300. A power plug 372 may terminate a distal or extending end of the AC cable 370. In some embodiments, an enclosure extension 374 may extend rearward from the adapter enclosure 302. The AC cable 370 may extend from the enclosure extension 374.

The power adapter 152 (FIG. 3) may be contained in the adapter enclosure 302. The power adapter 152 electrically interfaces with a proximal end of the AC cable 370 such that electrical power on the AC cable 370 is supplied to the power adapter 152; for instance, and without limitation, the power adapter 152 may be plugged into a female socket (not illustrated) on the proximal end of the AC cable 370.

In an illustrative application of the electronic device charger accessory 300, the power plug 372 may be plugged into an electrical wall outlet 164 (FIG. 3). The AC cable 370 may be extended from the electrical wall outlet 164 to the location at which the second connector 362 of the device charger cable 360 is to be inserted in the power port on the electronic device 168 (FIG. 6). The link 344 of the electronic device charger accessory 300 may be deployed from the extended configuration illustrated in FIG. 9 to the folded, space-efficient configuration (similarly to FIG. 5). The second connector 362 may be inserted into the power port on the electronic device 168 for recharging.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An electronic device charger accessory suitable for enclosing and securing a power adapter to a charger cord during the charging of an electronic device, the electronic device charger accessory comprising:

an adapter enclosure, comprising an interior configured to receive a power adapter, wherein a front side of the adapter enclosure comprises a first opening providing access to the interior of the adapter enclosure;

a flexible link extending from a front end of the adapter enclosure; and a connector sleeve carried by the link, the connector sleeve comprising an interior configured to receive a first connector of a device charger cable, wherein a front side of the connector sleeve comprises a first opening providing access to the interior of the connector sleeve; wherein the electronic device charger accessory is selectively positionable, by deforming the link, into:

a first position, in which the link is arranged in an extended position and the adapter enclosure and connector sleeve are arranged in a spaced-apart relationship with one another, and a second position, in which the link is flexed towards the adapter enclosure, and the first opening of the connector sleeve is arranged adjacent to and faces the first opening of the adapter enclosure, and in which the interior and first opening of the adapter enclosure and the interior and first opening of the connector sleeve are aligned to receive a first connector of the device charger cable.

2. The electronic device charger accessory of claim 1, wherein the link extends from a front end of the connector sleeve.

3. The electronic device charger accessory of claim 1, wherein the link is elastically flexible.

4. The electronic device charger accessory of claim 1, wherein the link is planar.

5. The electronic device charger accessory of claim 1, wherein a front side of the link is coplanar with at least one of the front side of the connector sleeve and the front side of the adapter enclosure.

6. The electronic device charger accessory of claim 1, wherein the adapter enclosure, connector sleeve and link are integrally formed into a single-piece unit.

7. The electronic device charger accessory of claim 1, wherein the adapter enclosure is elastically stretchable.

8. The electronic device charger accessory of claim 1, wherein the connector sleeve is elastically stretchable.

9. The electronic device charger accessory of claim 1, wherein, in the second position, a space is defined between the link and the front side of the adapter enclosure, said space sized to fit at least one section of the device charger cable, with said at least one section vertically enclosed within said space by said link and by said first connector of the device charger cable when extended through the first openings of the adapter enclosure and connector sleeve.

10. The electronic device charger accessory of claim 1, further comprising a cord wrap extending from the adapter enclosure.

11. The electronic device charger accessory of claim 10, wherein the cord wrap comprises a first portion configured for the wrapping thereon of a cord, and a second portion wider than and arranged outward of the first portion for retaining the wrapped cord at the first portion.

12. The electronic device charger accessory of claim 10, wherein the cord wrap extends from the top side of the adapter enclosure, and is opposite to the connector sleeve when the electronic device charger accessory is arranged in the first position.

13. The electronic device charger accessory of claim 1, further comprising a pair of earbud holders extending from the adapter enclosure.

14. The electronic device charger accessory of claim 13, wherein the pair of earbud holders extends from opposite left and right sides of the adapter enclosure.

15. The electronic device charger accessory of claim 13, wherein each of the earbud holders is tubular.

16. The electronic device charger accessory of claim 1, wherein the adapter enclosure further comprises a second opening on a rear side of the adapter enclosure, the second opening providing access to the interior of the adapter enclosure for receiving a housing of the power adapter into the interior of the adapter enclosure through the second opening.

17. The electronic device charger accessory of claim 1, wherein the connector sleeve further comprises a second opening, the second opening providing access to the interior of the connector sleeve and configured for the passage therethrough of a second connector of the device charger cable.

18. The electronic device charger accessory of claim 17, wherein the second opening is smaller than the first opening of the connector sleeve and is configured to prevent the passage therethrough of the first connector of the device charger cable.

19. An electronic device charger accessory suitable for enclosing and securing a power adapter to a charger cord during the charging of an electronic device, the electronic device charger accessory comprising:

an adapter enclosure, comprising an interior configured to receive a power adapter, wherein a front side of the adapter enclosure comprises a first opening providing access to the interior of the adapter enclosure;

a flexible link extending from a front end of the adapter enclosure; and a connector sleeve carried by the link, with the link extending from a front end of the connector sleeve, the connector sleeve comprising an interior configured to receive a first connector of a device charger cable, wherein a front side of the connector sleeve comprises a first opening providing access to the interior of the connector sleeve; wherein the electronic device charger accessory is selectively positionable, by deforming the link, into:

a first position, in which the link is arranged in an extended position and the adapter enclosure and connector sleeve are arranged in a spaced-apart relationship with one another, and a second position, in which the link is flexed towards the adapter enclosure, and the first opening of the connector sleeve is arranged adjacent to and faces the first opening of the adapter enclosure, and in which the interior and first opening of the adapter enclosure and the interior and first opening of the connector sleeve are aligned to receive a first connector of the device charger cable.

20. An electronic device charger accessory suitable for enclosing and securing a power adapter to a charger cord during the charging of an electronic device, the electronic device charger accessory comprising:

an adapter enclosure, comprising an interior configured to receive a power adapter, wherein a front side of the adapter enclosure comprises a first opening providing access to the interior of the adapter enclosure;

a flexible link extending from a front end of the adapter enclosure; and a connector sleeve carried by the link, with the link extending from a front end of the connector sleeve, the connector sleeve comprising an interior configured to receive a first connector of a device charger cable, wherein a front side of the connector sleeve comprises a first opening providing access to the interior of the connector sleeve;

the electronic device charger accessory is selectively positionable, by deforming the link, into:

a first position, in which the link is arranged in an extended position and the adapter enclosure and connector sleeve are arranged in a spaced-apart relationship with one another, and a second position, in which the link is flexed towards the adapter enclosure, and the first opening of the connector sleeve is arranged adjacent to and faces the first opening of the adapter enclosure, and in which the interior and first opening of the adapter enclosure and the interior and first opening of the connector sleeve are aligned to receive a first connector of the device charger cable, and further in which a space is defined between the link and the front side of the adapter enclosure, said space sized to fit at least one section of the device charger cable, with said at least one section vertically enclosed within said space by said link and by said first connector of the device charger cable when extended through the first openings of the adapter enclosure and connector sleeve.

* * * * *